(12) United States Patent
Feng et al.

(10) Patent No.: US 12,153,828 B2
(45) Date of Patent: Nov. 26, 2024

(54) DUAL-CONTROLLER STORAGE SYSTEMS

(71) Applicant: ZHEJIANG DAHUA TECHNOLOGY CO., LTD., Zhejiang (CN)

(72) Inventors: Guobao Feng, Hangzhou (CN); Qiliang Wei, Hangzhou (CN); Honghao Yu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 475 days.

(21) Appl. No.: 17/645,326

(22) Filed: Dec. 21, 2021

(65) Prior Publication Data
US 2022/0147269 A1 May 12, 2022

Related U.S. Application Data

(63) Continuation of application No. PCT/CN2019/127446, filed on Dec. 23, 2019.

(30) Foreign Application Priority Data

Jun. 24, 2019 (CN) .................. 201910551512.X

(51) Int. Cl.
G06F 12/00 (2006.01)
G06F 3/06 (2006.01)

(52) U.S. Cl.
CPC .......... G06F 3/0658 (2013.01); G06F 3/0611 (2013.01); G06F 3/0619 (2013.01);
(Continued)

(58) Field of Classification Search
CPC ............... G06F 3/0611; G06F 3/0658
(Continued)

(56) References Cited

U.S. PATENT DOCUMENTS 6,829,670 B1 * 12/2004 Nakamura ................ H04L 1/18
370/235
7,890,794 B1 * 2/2011 Gasser ................ G06F 11/0727
711/159
(Continued)

FOREIGN PATENT DOCUMENTS

CN 101382872 3/2009
CN 101776983 7/2010
(Continued)

OTHER PUBLICATIONS

International Search Report in PCT/CN2019/127446 mailed on Mar. 25, 2020, 4 pages.
(Continued)

*Primary Examiner* — Mohamed M Gebril
(74) *Attorney, Agent, or Firm* — METIS IP LLC

(57) ABSTRACT

Dual-controller storage systems and methods for controlling the dual-controller storage systems are provided. The dual-controller storage system may include a first controller, a second controller, at least one expander, a first storage array, and a second storage array. The at least one expander may be connected with the first controller, the second controller, the first storage array, and the second storage array. The first controller and the second controller may be communicatively connected via a network. When the first controller and the second controller both work in a normal state, the first controller may be configured to control the first storage array, and the second controller may be configured to control the second storage array. The first controller and the second controller may work in synchronization.

10 Claims, 9 Drawing Sheets

(52) U.S. Cl.
CPC ............ *G06F 3/0659* (2013.01); *G06F 3/067* (2013.01); *G06F 3/0689* (2013.01)

(58) Field of Classification Search
USPC .......................................................... 711/154
See application file for complete search history.

(56) References Cited

U.S. PATENT DOCUMENTS

| | | | |
|---|---|---|---|
| 8,880,709 B2* | 11/2014 | Dougall ................ | H04L 1/1851 709/228 |
| 8,943,234 B1* | 1/2015 | Voorhees .............. | G06F 3/0671 710/17 |
| 9,079,562 B2 | 7/2015 | Bert | |
| 2003/0101317 A1 | 5/2003 | Mizuno et al. | |
| 2003/0172316 A1* | 9/2003 | Tremblay ............ | G06F 11/2082 714/6.23 |
| 2003/0229698 A1 | 12/2003 | Furuhashi et al. | |
| 2007/0165660 A1 | 7/2007 | Fang et al. | |
| 2008/0005470 A1 | 1/2008 | Davies | |
| 2009/0037555 A1* | 2/2009 | Ueno .................... | G06F 3/0604 709/213 |
| 2010/0083040 A1 | 4/2010 | Voigt et al. | |
| 2012/0166724 A1 | 6/2012 | Smith | |
| 2012/0177039 A1* | 7/2012 | Berman ................ | H04L 49/354 370/428 |
| 2013/0117767 A1* | 5/2013 | Myrah .................. | G06F 13/102 719/326 |
| 2013/0124801 A1* | 5/2013 | Natrajan ............. | G06F 12/0868 711/126 |
| 2013/0132669 A1 | 5/2013 | Zhang et al. | |
| 2017/0322898 A1 | 11/2017 | Lin et al. | |
| 2019/0057003 A1* | 2/2019 | Ogawa .................. | G06F 3/0635 |
| 2020/0104161 A1* | 4/2020 | Kapur ................. | G06F 11/2041 |
| 2022/0050451 A1* | 2/2022 | Stay .................... | G05B 23/0291 |
| 2022/0147269 A1* | 5/2022 | Feng ....................... | G06F 3/065 |

FOREIGN PATENT DOCUMENTS

| | | |
|---|---|---|
| CN | 103440177 | 12/2013 |
| CN | 103488435 | 1/2014 |
| CN | 104486384 | 4/2015 |
| CN | 106775504 | 5/2017 |
| CN | 206178763 | 5/2017 |
| CN | 106814976 | 6/2017 |
| CN | 107122137 | 9/2017 |
| CN | 107291387 | 10/2017 |
| CN | 107704344 | 2/2018 |
| EP | 1037137 A2 | 9/2000 |
| WO | 2020258780 | 12/2020 |

OTHER PUBLICATIONS

Written Opinion in PCT/CN2019/127446 mailed on Mar. 25, 2020, 6 pages.
First Office Action in Chinese Application No. 201910551512.X mailed on Jan. 21, 2020, 19 pages.
The Second Office Action in Chinese Application No. 201910551512.X mailed on Jul. 24, 2020, 15 pages.
The Extended European Search Report in European Application No. 19935505.8 mailed on Jun. 21, 2022, 16 pages.

* cited by examiner

DUAL-CONTROLLER STORAGE SYSTEMS

CROSS-REFERENCE TO RELATED APPLICATIONS

This application is a continuation of International Application No. PCT/CN2019/127446, filed on Dec. 23, 2019, which designates the United States of America and claims priority of Chinese Patent Application No. 201910551512.X, filed on Jun. 24, 2019, the entire contents of which are incorporated herein by reference.

TECHNICAL FIELD

The present disclosure generally relates to the field of communication, and in particular to dual-controller and active-active storage systems and methods for controlling the dual-controller and active-active storage systems.

BACKGROUND

A dual-controller storage system is effective for ensuring data reliability, and it is also a preferred data storage solution for many small and medium enterprises. Firstly, the dual-controller storage system can support processing tasks for 7*24 hours via two controllers; secondly, the dual-controller storage system can implement the function of balancing the load of the two controllers. When the working state of one of the two controllers is abnormal, the other controller, as a backup controller, can take over the tasks of the abnormal controller.

FIG. 1 is a schematic diagram illustrating a common dual-controller storage system. As shown in FIG. 1, the controller A and the controller B communicate with each other via the network to synchronize the information related to the disk array management. The controller A and the controller B are connected with the disk array through different disk expanders. The disk array may be the serial attached small computer system interface (Serial Attached SCSI, for short SAS) hard disk.

Moreover, only one controller between the controller A and the controller B is working, the other controller is in a standby state, leading to a waste in hardware resources. Commonly used disk array includes the SAS hard disk rather than the Serial Advanced Technology Attachment (SATA) hard disk. The SAS hard disk is relatively expansive. Since the disk in the disk array shown in FIG. 1 needs to have two ports for connecting with the two controllers, respectively, the SATA hard disk which has only one port and a lower cost is not suitable to be used in the dual-controller system.

Regarding the phenomenon that a portion of the hardware resources is wasted when only one controller is working in the dual-controller storage system in the prior art, more solutions need to be developed. Therefore, it is desirable to provide more efficient and more economical dual-controller storage systems.

SUMMARY

According to an aspect of the present disclosure, a dual-controller storage system is provided. The dual-controller storage system may include a first controller, a second controller, at least one expander, a first storage array, and a second storage array. The at least one expander may be connected with the first controller, the second controller, the first storage array, and the second storage array. The first controller and the second controller may be communicatively connected via a network. When the first controller and the second controller both work in a normal state, the first controller may be configured to control the first storage array. The second controller may be configured to control the second storage array. The first controller and the second controller may work in synchronization.

In some embodiments, the first controller may be configured to send a heartbeat message to the second controller at first predetermined time intervals, and determine, based on feedbacks of the heartbeat message, whether the second controller is in a normal state or an abnormal state.

In some embodiments, in response to the determination that the second controller is in the normal state, the first controller may be configured to determine whether configuration data of the first storage array are synchronized in the second controller. In response to a determination that the configuration data of the first storage array are not synchronized, the first controller may send the configuration data to the second controller.

In some embodiments, the at least one expander may include a first expander and a second expander. The first expander and the second expander may be physically independent. The first controller may be connected with the first expander via a first port. The first controller may be connected with the second expander via a second port. The second controller may be connected with the second expander via a third port. The second controller may be connected with the first expander via a fourth port. The first expander may be connected with the first storage array. The second expander may be connected with the second storage array.

In some embodiments, when the second controller is in the normal state, the first port and the third port may be enabled, and the second port and the fourth port may be disabled.

In some embodiments, in response to a determination that the second controller is in the abnormal state, the first controller may be configured to enable the second port, and process one or more tasks of the second controller by controlling the second expander via the second port.

In some embodiments, in response to a determination that the second controller is in the abnormal state, the first controller may be further configured to send a heartbeat message to the second controller at second predetermined time intervals, and determine whether the second controller has returned to the normal state based on the heartbeat message. In response to a determination that the second controller has returned to the normal state, the first controller may disable the second port and stop processing the one or more tasks of the second controller. The second controller may be configured to control the second expander via the third port.

In some embodiments, the at least one expander may be a single physical expander. A third expander and a fourth expander may be segmented from the single physical expander. The first controller may be connected with the third expander via a fifth port. The second controller may be connected with the fourth expander via a sixth port. The third expander may be connected with the first storage array. The fourth expander may be connected with the second storage array.

In some embodiments, in response to a determination that the second controller is in the abnormal state, the first controller may be configured to combine the third expander and the fourth expander into a single expander, and process one or more tasks of the second controller by controlling the third expander via the fifth port.

In some embodiments, in response to a determination that the second controller is in the abnormal state, the first controller may be further configured to send a heartbeat message to the second controller at second predetermined time intervals, and determine whether the second controller has returned to the normal state based on feedbacks of the heartbeat message. In response to a determination that the second controller has returned to the normal state, the first controller may segment the single expander to obtain the third expander and the fourth expander. The first controller maybe further configured to stop processing the one or more tasks of the second controller. The second controller may be configured to control the second expander via the sixth port.

In some embodiments, the first storage array and the second storage array may include at least one of a Peripheral Component Interconnect Express (PCIE) disk array, a Serial Attached SCSI (SAS) disk array, a Serial Advanced Technology Attachment (SATA) disk array, a Non-Volatile Memory Express (NVME) disk array, a solid state disk array, or a mechanical hard disk array.

According to another aspect of the present disclosure, a method for controlling a dual-controller storage system is provided. The method may be implemented on a computing device including at least one processor and at least one storage medium. The method may include sending, by a first controller, a heartbeat message to a second controller at first predetermined time intervals and determining, by the processor and based on the heartbeat message, whether the second controller may be in a normal state or an abnormal state. The method may further include, in response to a determination that the second controller is in the normal state, causing the first controller to control a first storage array and causing the second controller to control a second storage array. At least one expander may be connected with the first controller, the second controller, the first storage array, and the second storage array. The first controller and the second controller may work in synchronization.

In some embodiments, in response to the determination that the second controller may be in the normal state, the method further includes determining whether configuration data of the first storage array are synchronized in the second controller. The method may further include, in response to a determination that the configuration data of the first storage array are not synchronized, causing the first controller to send the configuration data to the second controller.

In some embodiments, the at least one expander may include a first expander and a second expander. The first expander and the second expander may be physically independent. The first controller may be connected with the first expander via a first port. The first controller may be connected with the second expander via a second port. The second controller may be connected with the second expander via a third port. The second controller may be connected with the first expander via a fourth port. The first expander may be connected with the first storage array. The second expander may be connected with the second storage array.

In some embodiments, when the second controller is in the normal state, the first port and the third port may be enabled. The second port and the fourth port may be disabled.

In some embodiments, in response to a determination that the second controller is in the abnormal state, the method may further include enabling the second port, and causing the first controller to process one or more tasks of the second controller by controlling the second expander via the second port.

In some embodiments, in response to a determination that the second controller is in the abnormal state, the method may further include causing the first controller to send a heartbeat message to the second controller at second predetermined time intervals, and determining whether the second controller has returned to the normal state based on feedbacks of the heartbeat message. In response to a determination that the second controller has returned to the normal state, the method may further include disabling the second port, causing the first controller to stop processing the one or more tasks of the second controller, and causing the second controller to control the second expander via the third port.

In some embodiments, the at least one expander may be a single physical expander. A third expander and a fourth expander may be segmented from the single physical expander. The first controller may be connected with the third expander via a fifth port. The second controller may be connected with the fourth expander via a sixth port. The third expander may be connected with the first storage array, and the fourth expander may be connected with the second storage array.

In some embodiments, in response to a determination that the second controller is in the abnormal state, the method may further include combining the third expander and the fourth expander into a single expander, and causing the first controller to process one or more tasks of the second controller by controlling the third expander via the fifth port.

In some embodiments, in response to a determination that the second controller is in the abnormal state, the method may further include causing the first controller to send a heartbeat message to the second controller at second predetermined time intervals, and determining whether the second controller has returned to the normal state based on the heartbeat message. In response to a determination that the second controller has returned to the normal state, the method may further include segmenting the single expander to obtain the third expander and the fourth expander, stop processing the one or more tasks of the second controller, and causing the second controller to control the second expander via the sixth port.

In some embodiments, the first storage array and the second storage array may include at least one of a Peripheral Component Interconnect Express (PCIE) disk array, a Serial Attached SCSI (SAS) disk array, a Serial Advanced Technology Attachment (SATA) disk array, a Non-Volatile Memory Express (NVME) disk array, a solid state disk array, or a mechanical hard disk array.

According to still another aspect of the present disclosure, a non-transitory computer readable medium is provided. The non-transitory computer readable medium may include a set of instructions for controlling a dual-controller storage system. When executed by at least one processor, the set of instructions may direct the at least one processor to effectuate a method. The method may include sending, by a first controller, a heartbeat message to a second controller at first predetermined time intervals, and determining, by the processor and based on the heartbeat message, whether the second controller may be in a normal state or an abnormal state. The method may further include, in response to a determination that the second controller may be in the normal state, causing the first controller to control a first storage array, and causing the second controller to control a second storage array. The at least one expander may be connected with the first controller, the second controller, the first storage array, and the second storage array. The first controller and the second controller may work in synchronization.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expressions if they may achieve the same purpose.

Figure 1:
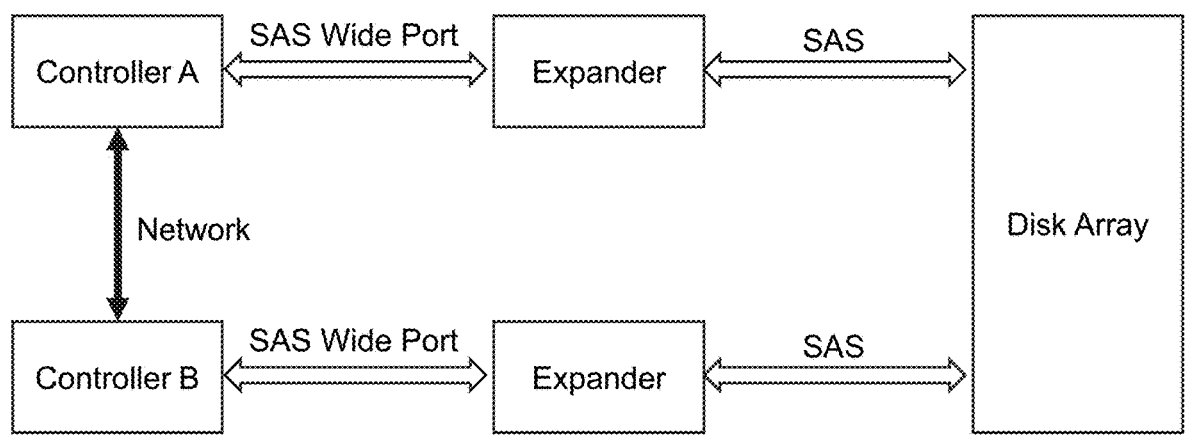
FIG. 1 is a schematic diagram illustrating a common dual-controller storage system.
Figure 2:
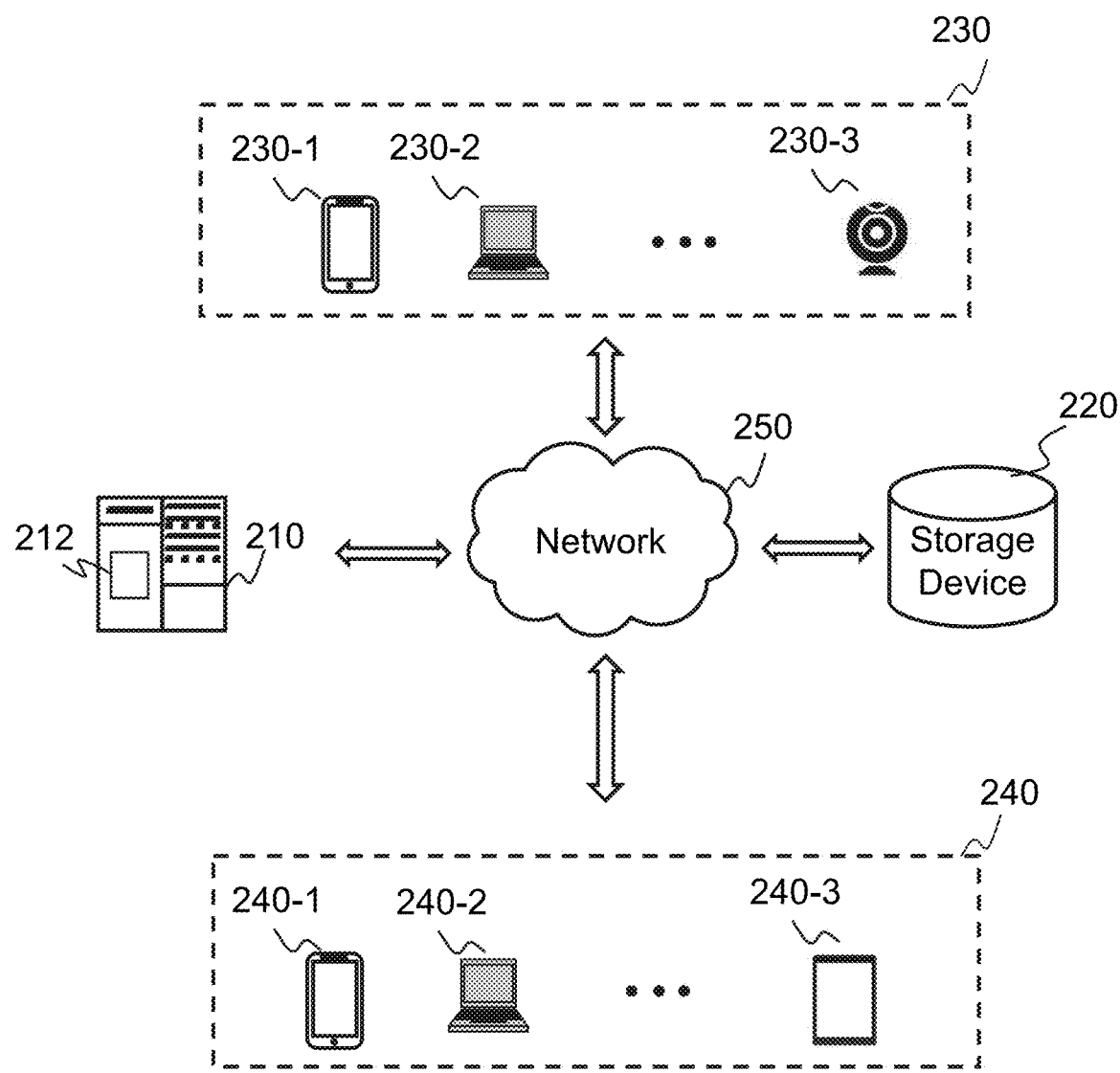
FIG. 2 is a schematic diagram illustrating an exemplary data processing system according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks) but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used to distinguish the purpose of description, and cannot be interpreted as indicating or implying relative importance, nor can be understood as indicating or implying the order.

An aspect of the present disclosure relates to dual-controller storage systems and methods for controlling the storage systems. The dual-controller storage system may include a first controller, a second controller, at least one expander, a first storage array, and a second storage array (e.g., a disk array including a plurality of physically independent disks). The at least one expander is connected with the first controller, the second controller, the first storage array, and the second storage array. The first controller and the second controller may be communicatively connected via a network, and when the dual-controller system works in an active-active mode, the first controller is configured to control the first storage array and the second controller is configured to control the second storage array. The first controller and the second controller may work in synchronization to process various tasks. In some embodiments, the first controller may be a backup controller for the second controller, while the second controller may be a backup controller for the first controller. When one of the two controllers is determined to be in an abnormal state, the other normal controller may take over the tasks of the abnormal state. The dual-controller storage systems and methods for controlling the dual-controller storage systems may take more advantage of the hardware resources since both of the controllers can work at the same time. Thus, the efficiency of the dual-controller storage systems disclosed in the present disclosure may be improved. Disks that have a lower cost than the SAS disk, such as the SATA disk may be used in the dual-controller storage systems, which may decrease the cost for the dual-controller storage systems.

FIG. 2 is a schematic diagram illustrating an exemplary data processing system according to some embodiments of the present disclosure. As shown, the data processing system 200 may include a server 210, a storage device 220, an acquisition device 230, a user terminal 240, and a network 250.

The server 210 may process information and/or data relating to the data processing system 200 to perform one or more functions described in the present disclosure. In some embodiments, the server 210 may include one or more processing engines 212 (e.g., single-core processing engine(s) or multi-core processor(s)). In some embodiments, the processing engine 212 may be configured to obtain data from the storage device 220. For instance, the processing engine 212 may obtain video data, image data, and/or other forms of data from the storage device 220 and perform further analysis on the obtained data. Merely by way of example, the processing engine 212 may obtain video data associated with the traffic, and determine whether a vehicle in the video data violated a traffic rule. Merely by way of example, the processing engine 212 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The server 210 may be a single server or a server group. The server group may be centralized, or distributed (e.g., server 210 may be a distributed system). In some embodiments, the server 210 may be local or remote. For example, the server 210 may access information and/or data stored in the acquisition device 230, and/or the storage device 220 via the network 250. As another example, the server 210 may be directly connected to the acquisition device 230, and/or the storage device 220 to access stored information and/or data. In some embodiments, the server 210 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 210 may be implemented on a computing device 300 having one or more components illustrated in FIG. 2 of the present disclosure.

The storage device 220 may store data and/or instructions. The data and/or instructions may be obtained from, for example, the server 210, the acquisition device 230, and/or any other component of the data processing system 200.

In some embodiments, the storage device 220 may store data and/or instructions that the server 210 may execute or use to perform exemplary methods described in the present disclosure. In some embodiments, a dual-controller system may be implemented on the storage device 220. The dual-controller system may include a first controller, a second controller, at least one expander, a first storage array, and a second storage array (e.g., a disk array including a plurality of physically independent disks). In some embodiments, the storage device 220 may include many independent storage devices and may be arranged as a storage array. The at least one expander is connected with the first controller, the second controller, the first storage array, and the second storage array. The first controller and the second controller may be communicatively connected via a network, and when the dual-controller system works in an active-active mode, the first controller is configured to control the first storage array and the second controller is configured to control the second storage array. The first controller and the second controller may work in synchronization to process various tasks. In some embodiments, the first controller may be a backup controller for the second controller, while the second controller may be a backup controller for the first controller. When one of the two controllers is determined to be in an abnormal state, the other normal controller may take over the tasks of the abnormal state.

In some embodiments, the storage device 220 may include a mass storage, a removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 220 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 220 may be connected to the network 250 to communicate with one or more components of the data processing system 200 (e.g., the server 210, the acquisition device 230). One or more components of the data processing system 200 may access the data or instructions stored in the storage device 220 via the network 250. In some embodiments, the storage device 220 may be directly connected to or communicate with one or more components of the data processing system 200 (e.g., the server 210, the acquisition device 230). In some embodiments, the storage device 220 may be part of another component of the data processing system 200, such as the server 210, the acquisition device 230, or the user terminal 240.

In some embodiments, one or more components of the data processing system 200 (e.g., the server 210, the acquisition device 230) may have permission to access the storage device 220. For example, the server 210 or the user terminal 240 may obtain an image to be processed stored in the storage device 220.

The acquisition device 230 may be and/or include any suitable device that is capable of acquiring data. In some embodiments, the acquisition device 230 may include a mobile phone 230-1, a computer 230-2, a surveillance camera 230-3, etc. The computer 230-2 may include but not limited to a laptop, a tablet computer, a desktop, or the like, or any combination thereof. The surveillance camera 230-3 may include but not limit to a gun camera, a dome camera, an integrated camera, a monocular camera, a binocular camera, a multi-view camera, or the like, or any combination thereof. The image acquired by the acquisition device 230 may be a single image or a frame of a video. In some embodiments, the acquisition device 230 may include a plurality of components each of which can acquire data, such as an image, a video, a dataset, etc. For example, the acquisition device 230 may include a plurality of sub-cameras that can take pictures or videos simultaneously.

The user terminal 240 may be associated with a user. Exemplary terminal devices 240 may include a mobile phone 240-1, a computer 240-2, a tablet computer 240-3, or the like. In some embodiments, the user terminal 240 may be and/or include any suitable device that can display or output information in a human-readable form, such as text, image, audio, video, graph, animation, or the like, or any combination thereof. In some embodiments, the user may view information and/or input data and/or instructions via the user terminal 240. For example, the user may send a request for viewing a video via the user terminal 240. The user terminal 240 may obtain the video from the storage device 220. The user may view the video via a display device of the user terminal 240. As another example, the user may input an instruction to upload data (e.g., a video) via the user terminal 240. The uploaded data may be stored in the storage device 220. The display device of the user terminal 240 may include a cathode ray tube (CRT) display, a liquid crystal display (LCD), a light emitting diode (LED) display, a plasma display panel (PDP), a 3D display, or the like. In some embodiments, the user terminal 240 may be connected to one or more components of the data processing system 200 (e.g., the server 210, the storage device 220, the acquisition device 230) via the network 250, such as a wireless network or a wired network (e.g., a coaxial cable network).

The network 250 may include any suitable network that can facilitate the exchange of information and/or data for the data processing system 200. In some embodiments, one or more components in the data processing system 200 (e.g., the server 210, the storage device 220, and the acquisition device 230) may send information and/or data to another component(s) in the data processing system 200 via the network 250. For example, the server 210 may obtain/acquire images, videos, texts, audios, graphs, animation, from the acquisition device 230 via the network 250. In some embodiments, the network 250 may be any type of wired or wireless network, or a combination thereof. Merely by way of example, the network 250 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. For example, the storage device 220 may be integrated into the server 110. However, those variations and modifications do not depart from the scope of the present disclosure.

Figure 3:
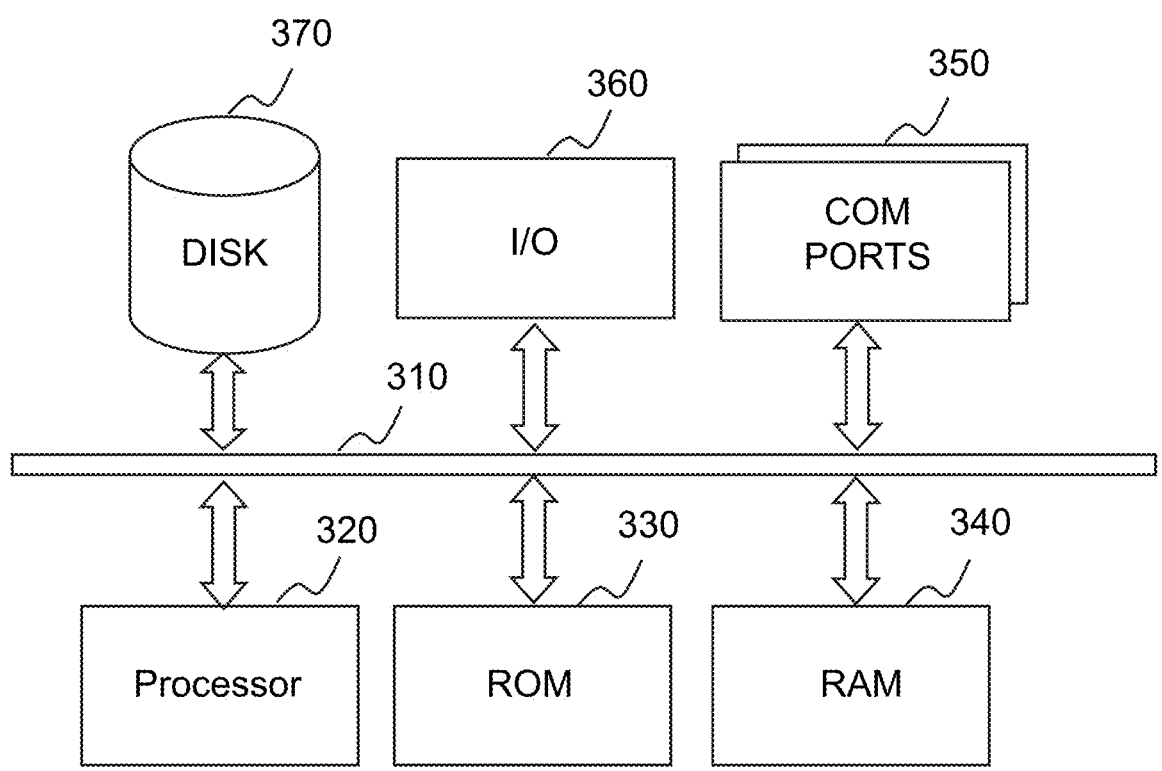
FIG. 3 is a schematic diagram illustrating exemplary hardware and/or software components of an exemplary computing device according to some embodiments of the present disclosure.

FIG. 3 is a schematic diagram illustrating exemplary hardware and/or software components of an exemplary computing device according to some embodiments of the present disclosure. In some embodiments, the server 210 may be implemented on the computing device 300 shown in FIG. 3. For example, the processing engine 212 may be implemented on the computing device 300 and configured to perform functions of the processing engine 212 disclosed in this disclosure. The computing device 300 may obtain data (e.g., videos, images) from the storage device 220. The dual-controller storage system may be implemented on the storage device 220.

The computing device 300 may be used to implement any component of the data processing system 200 as described herein. For example, the processing engine 212 may be implemented on the computing device 300, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 300, for example, may include COM ports 250 connected to and from a network connected thereto to facilitate data communications. The computing device 300 may also include a processor (e.g., the processor 320), in the form of one or more processors (e.g., logic circuits), for executing program instructions. For example, the processor 320 may include interface circuits and processing circuits therein. The interface circuits may be configured to receive electronic signals from a bus 310, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 310.

The exemplary computing device may further include program storage and data storage of different forms including, for example, a disk 370, and a read-only memory (ROM) 330, or a random-access memory (RAM) 340, for various data files to be processed and/or transmitted by the computing device. The exemplary computing device may also include program instructions stored in the ROM 330, RAM 340, and/or another type of non-transitory storage medium to be executed by the processor 320. The methods and/or processes of the present disclosure may be implemented as the program instructions. The computing device 300 may also include an I/O component 360, supporting input/output between the computer and other components. The computing device 300 may also receive programming and data via network communications.

Merely for illustration, only one processor is illustrated in FIG. 3. Multiple processors 220 are also contemplated; thus, operations and/or method steps performed by one processor 220 as described in the present disclosure may also be jointly or separately performed by the multiple processors. For example, if in the present disclosure the processor 220 of the computing device 300 executes both step A and step B, it should be understood that step A and step B may also be performed by two different processors 220 jointly or separately in the computing device 300 (e.g., a first processor executes step A and a second processor executes step B or the first and second processors jointly execute steps A and B).

Figure 4:
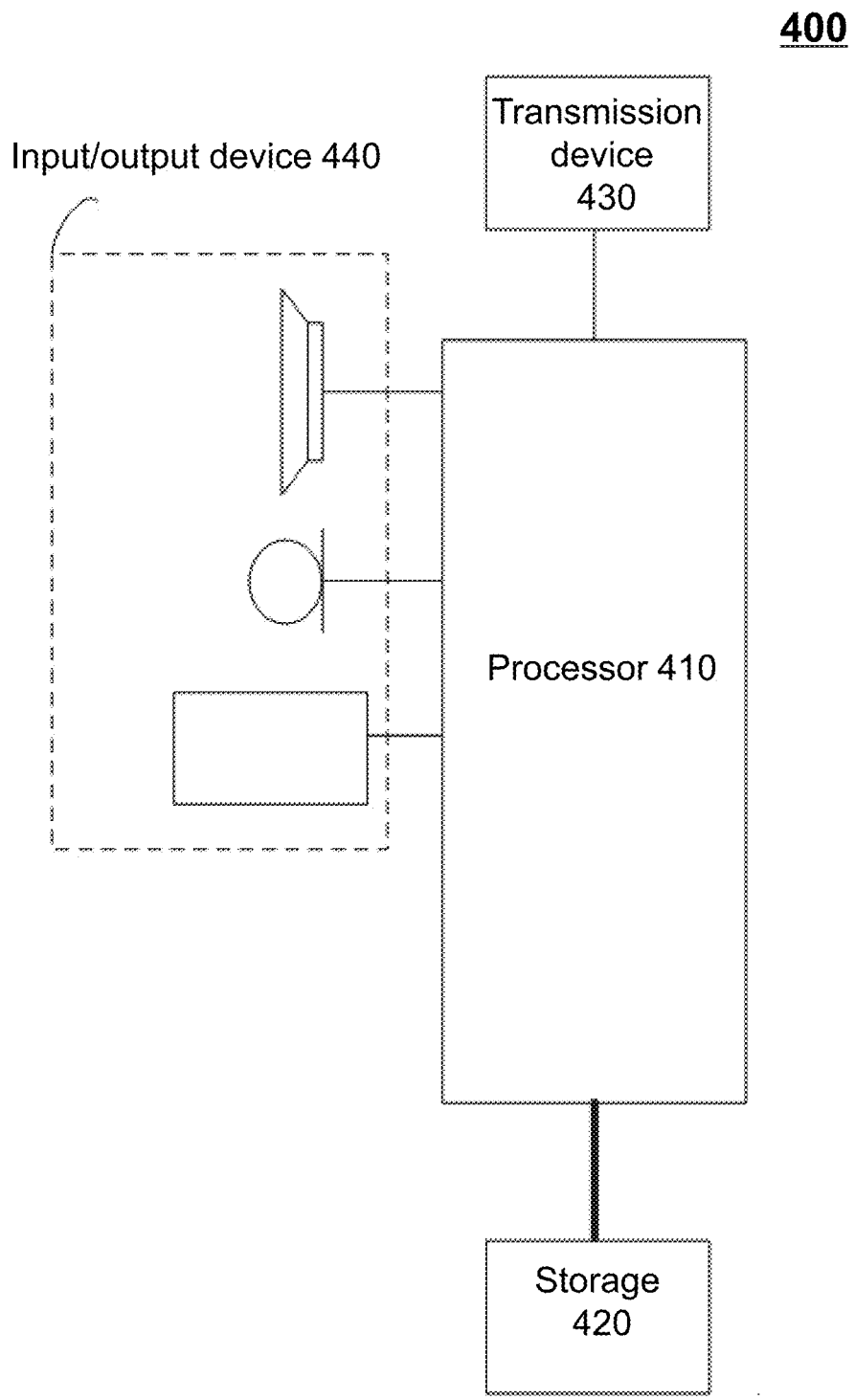
FIG. 4 is a schematic diagram illustrating an exemplary terminal device according to some embodiments of the present disclosure.

FIG. 4 is a schematic diagram illustrating an exemplary terminal device according to some embodiments of the present disclosure. As shown in FIG. 4, the mobile terminal 400 may include one or more (only one shown in FIG. 4) processors 410 (the processor 410 may include but is not limited to a processing device such as a Microprocessor Unit (MCU) or a programmable logic device (PLD) and a storage 420 for storing data. Optionally, the mobile terminal may also include a transmission device 430 for communication functions and an input/output device 440. One of the ordinary skills in the art would understand that the structure shown in FIG. 4 is merely illustrative and does not limit the structure of the mobile terminal. For example, the mobile terminal 400 may further include more or fewer components than those shown in FIG. 4, or have a different configuration than that shown in FIG. 4.

The storage 420 may be configured to store computer programs such as software programs and modules for implementing software programs, for example, a computer program corresponding to a message receiving method in the embodiment of the present disclosure. The processor 410 may execute various function applications and data processing by running a computer program stored in the storage 104, that is, implementing the method described above. The storage 420 may include a high speed random storage, and may also include a non-volatile storage such as one or more magnetic storage devices, flash memory, or other non-volatile solid storages. In some embodiments, the storage 420 may further include a remote storage relative to the processor 410, which may be connected to the mobile terminal 400 via a network. Examples of the network include but are not limited to the Internet, an intranet, a local area network, a mobile communication network, or the like, or any combination thereof.

The transmission device 430 is configured to receive or transmit data via a network. For example, the network may include a wireless network provided by a communication provider of the mobile terminal 400. In one example, the transmission device 430 may include a Network Interface Controller (NIC). The transmission device 430 may communicate with other devices via the Internet through a base station connected to other devices that are connected to the network. In some embodiments, the transmission device 430 may include a Radio Frequency (RF) module for communicating with the Internet wirelessly.

In some embodiments, the mobile terminal 400 may be configured to transmit data to the dual-controller and active-active storage system. As used herein, the term "dual-controller and active-active storage system" refers to a system that includes two controllers that can work in synchronization to process tasks (e.g., obtain data or store data in the first storage array and/or the second storage array). When the dual-controller system works in an active-active mode, the first controller is configured to control the first storage array and the second controller is configured to control the second storage array. For instance, the dual-controller and active-active storage system may be configured for storing data such as videos, images, audios, text files, or the like, or any combination thereof. In some embodiments, the mobile terminal 400 may be configured to obtain data from the dual-controller and active-active storage system. For example, the mobile terminal 400 may obtain a video from the dual-controller and active-active storage system. The user may view the video via the mobile terminal 400.

Figure 5:
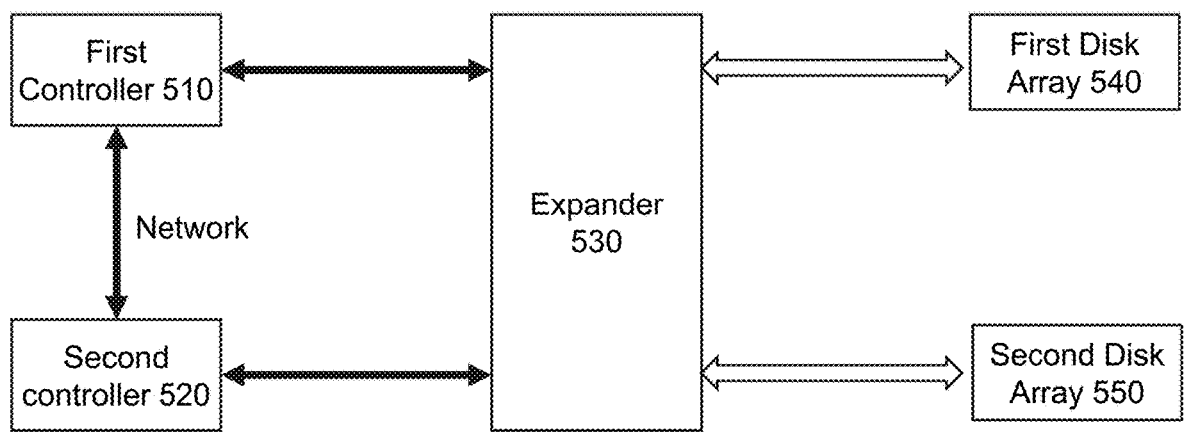
FIG. 5 is a block diagram illustrating an exemplary dual-controller and active-active storage system according to some embodiments of the present disclosure.

FIG. 5 is a block diagram illustrating an exemplary dual-controller and active-active storage system according to some embodiments of the present disclosure. As shown in FIG. 5, according to an embodiment of the present disclosure, a dual-controller and active-active storage system is provided, including at least: a first controller 510, a second controller 520, an expander 530, two completely independent disk arrays (i.e., a first disk array 540 and a second disk array 550).

The upstream port of the expander 530 is connected to the first controller 510 and the second controller 520. The downstream port of the expander 530 is connected to the first disk array 540 and the second disk array 550. The first controller 510 and the second controller 520 are connected via a network.

As used herein, the controller is an interface between the storage device and other devices. The controller may be connected to one or more components of the data processing system 200 via a network, a bus, a cable, etc. For instance, the one or more components of the data processing system may include computers that require data reading and storing, mobile terminals, data acquisition devices (such as cameras, recording devices), central processors (CPUs), and network interfaces. The controller may obtain instructions for reading and writing data from other parts of the information system, and write data (i.e., storage data) to the storage device, or read data from the storage device. The controller includes one or more ports for connecting with storage devices and other devices (such as the processing engine 212). In some embodiments, the port(s) of the controller supports data communication protocols such as the Serial Attached SCSI (SAS) protocol, the Serial Advanced Technology Attachment (SATA) protocol, the Non-Volatile Memory Express (NVME) protocol, the Peripheral Component Interface Express (PCIE) protocol, or the like. In some embodiments, multiple ports of different categories may be used for connecting one or more devices (e.g., one or more processing engine 212) to a single controller. In some embodiments, two or more controllers may be connected to a processor (e.g., the processor 320 of the computing device 300). The processor may direct the controller to implement one or more functions, such as the determination of whether another controller is in an abnormal state. In some embodiments, the processor may be integrated into a controller, for example, in the form of a micro CPU.

In some embodiments, the storage system may include more than two controllers. In an active mode, each controller may be configured to control a disk array. When one of the controllers does not work in a normal state, the tasks of this controller may be processed by one or more other controllers that work normally. In some embodiments, the controller may enable the processing engine 212 (e.g., the CPU) to communicate with the storage device and control how data is read and stored. In some embodiments, the controller (first controller, second controller) is configured for conversion between the network protocol and the hard disk protocol. It may include a hard disk controller (usually storage controller).

In some embodiments, an expander may be used to connect the controller and the storage device. The expander may have a plurality of ports for connecting a plurality of physically independent storage devices. For instance, the expander may enable the controller to be connected to multiple physically independent storage devices (e.g., disks) via one port (e.g., a wide port). For example, the controller may include 8 ports and can be directly connected with 8 disks. By using an expander, the controller may be connected with 24 disks, 72 disks, or more. In some embodiments, the port that connects the expander and the disk array supports protocols such as the SAS protocol, the SATA protocol, the NVME protocol, or the like, or any combination thereof. In some embodiments, multiple ports of different categories may be used for connecting a single controller with multiple physically independent storage devices. For instance, a portion of the ports for connecting the expander and the disk array may support the SAS protocol, and a portion of the ports may support the SATA protocol. In some embodiments, the port that connects the expander and the controller may support the SAS protocol, the NVME protocol, and/or other protocols.

A storage device is a device for storing data and may include a hard disk, a light storage device, a chip-based storage device, or the like. For example, SAS hard disks (including mechanical hard disks and solid state hard disks), SATA hard disks, NVME SSD (Solid State Disk), HHD (Hard Disk Drive), CD-ROM (Compact Disc Read-Only Memory), DVD-ROM (Digital Video Disc-Read Only Memory), CD-RW (CD Rewritable), DVD-RAM (Digital Visual Disc-Random-access memory), semiconductor memory, or the like. The storage device may use a technique that disperses data (such as Distributed storage technology) or a technique that combines a plurality of devices, such as Redundant Array of Inexpensive Disks (RAID). In some embodiments, a storage device may be an independent storage device, such as a hard disk, or may be a combined storage device, such as a disk array.

In some embodiments, the system may include one or more storage devices. These storage devices may have different models, capacities, and reading/writing speeds. For example, a storage device may include a disk array based on one or more mechanical hard disks, and another storage device may include a disk array based on one or more SSDs. As another example, a storage device may include a disk array using RAID-0 technology, and another storage device may include a disk array using RAID-5 technology.

In some embodiments, the storage system may include two controllers and two expanders. In some embodiments, the two expanders may be physically independent. In some embodiments, the two expanders may be segmented from the same physical expander. The controller may be connected to the expander via a port. For example, one controller can be connected with two expanders at the same time. Usually, a controller is only connected to one expander. When one controller is unable to work, the other controller that is working normally may be connected to the abnormal controller. In this case, the controller that works normally may read or write data via the two expanders. In some embodiments, the connection between the controller and the expander(s) may include various types of high-speed data transmission connections. For instance, the speed of the high-speed data transmission may be greater than 1 MB/s. For example, the controller and the expander(s) may be connected via the SAS protocol.

In some embodiments, the controller and the expander(s) may be connected via a switching device. In some embodiments, the controller and the expander port may be connected via a bus.

In some embodiments, a connection may be established between controllers. The inter-controller connection may be used to transmit signals between controllers, such as signals encoding a heartbeat message (interchangeably referred to as a "heartbeat packet"), configuration information, or the like, or any combination thereof. As used herein, the heartbeat message is configured to determine an operating state of the controller, i.e., whether the controller is working normally.

The connection between the controllers may include various means. For example, the controllers may be connected via a wired connection (e.g., via cables, optical fibers) or a wireless connection (e.g., via Bluetooth, WIFI or Zigbee). In some embodiments, the connection between controllers may be a low-speed connection.

In some embodiments, the controllers may be connected via other devices or networks. For example, the expander may include a CPU and may be able to receive and send data. Two or more controllers may be connected to the same expander, and the controllers may communicate with each other by exchanging data with the expander. As another example, a plurality of controllers may transmit data by connecting to the network of other devices.

In some embodiments, the storage array may be a disk array. The disk array may include multiple physically independent disks arranged as a disk group with relatively large storage capacity. The data to be stored may be divided into many segments and stored on individual hard disks.

In an alternative embodiment, as shown in FIG. 5, in the case that the expander 530 includes two independent expanders (e.g., a first expander and a second expander), the first controller 510 is connected to the first expander through the first wide port. The first controller 510 is connected to the second expander through a second wide port. The first expander is connected to the first disk array 540. The second controller 520 is connected to the second expander through a third wide port, and the second controller 520 is connected to the first expander through a fourth wide port. The second expander is connected to the second disk array 550.

Optionally, the first controller 510 is configured to send a heartbeat message to the second controller 520 and determine that the state of the second controller 520 is abnormal if no heartbeat response message returned by the second controller 520 is received within the predetermined time period. The first controller may further control the second expander via the second wide port to take over the configured tasks of the second controller 520.

Additionally or alternatively, the second controller 520 is configured to send a heartbeat message to the first controller 510, and determine that the state of the first controller 510 is abnormal if no heartbeat response message of the first controller 510 is received within the predetermined time period. The second controller may further control the first expander by the fourth wide port to take over the configured tasks of the first controller 510.

In some embodiments, the heartbeat message may be data sent according to predetermined intervals and may be used to monitor whether the controller work in a normal state. In some embodiments, both controllers may send heartbeat messages to each other so that the working state of both of the controllers are monitored. The predetermined interval of the heartbeat message can be set and/or adjusted as needed.

In some embodiments, the second controller may determine the state of the first controller according to the feedbacks of the heartbeat message of the first controller within a number of time periods. For example, if no heartbeat message is received after N times of sending the heartbeat messages in succession, the state of the first controller may be determined to be abnormal. N may be set as needed, for example, N may be 2, 3, 4, etc. As another example, if the heartbeat message receiving rate within a time period is lower than a threshold, the first controller state may be determined to be abnormal. The threshold can be set as needed, for example, 60%, 80%, 90%. The time period can be set as needed, for example, 100 ms, 0.5 s, 1 s, 5 s.

In some embodiments, the abnormal state may be further divided into different types. Additionally or alternatively, data about the abnormal state may be generated and stored for further analysis. In some embodiments, the abnormal state may include but not limited to a low responding speed, a non-responding state, a low processing speed, etc. The determination of the type of abnormal state may be conducted based on the feedbacks of the heartbeat message. For example, when the second controller 520 does not receive any response message from the first controller 510 after certain times of sending the heartbeat message, the second controller 520 may determine that the first controller is in a non-responding state. When the second controller 520 receives the response message from the first controller 510 after the predetermined time period, the second controller 520 may determine that the first controller is in a slow-responding state.

In some embodiments, a controller may write heartbeat message data in the expander at predetermined time intervals, and if another controller can read the heartbeat message data in the expander, it indicates that the communication between the controller that writes the heartbeat message and the expander is normal. When another controller cannot read the heartbeat message data in the expander, it indicates that the communication between the controller that writes the heartbeat message and the expander is abnormal or that the controller that writes the heartbeat message has stopped working. When another controller reads the data and the issue rate is lower than the preset threshold, the controller that writes the heartbeat message data may be determined to be abnormal (for example, the processing speed and the response speed are slow).

In some embodiments, when one controller is in an abnormal state, the other controller may take over the disk array that was originally controlled by the abnormal controller. For example, when the controller stores data into the disk array, the data is originally transmitted to the disk array at a certain transmission speed. In some embodiments, another controller that works normally may take over some of the tasks of the abnormal controller. At least a portion of the tasks of the abnormal controller may be taken over by the normal controller. For example, in response to a determination that the abnormal controller is in a non-responding state, the abnormal controller may be made offline for further examination and/or repair. As another example, in response to a determination that the abnormal controller is in a slow-responding state, the speed of data flow for the abnormal controller may be limited.

Optionally, the first controller 510 is configured to send a heartbeat message to the second controller 520, and send a configuration synchronization mark to the second controller 520 if the heartbeat response message of the second controller 520 is received within a predetermined time period. The first controller 510 is further configured to delay sending the heartbeat message to the second controller 520 in the case of determining that the configuration has completed synchronization. The first controller 510 is configured to synchronize with the second controller 520 by sending a synchronization configuration to the second controller 520 in the case of determining that the configuration has not completed synchronization, and send the heartbeat message to the second controller 520 with a delay after the synchronization configuration is complete.

The synchronization mark may be used to detect whether the configuration data of the two controllers are synchronized. For instance, the configuration data to be synchronized between the two controllers may include data related to the first disk array and the second disk array, such as operating parameters, product identification number, serial number field, user assigned identification field, time stamp field, or the like, or any combination thereof. Merely by way of example, the configuration data may include a RAID type, file system information, data related to inter-process communication (IPC), or the like, or any combination thereof. In some embodiments, the configuration data is stored in the first disk array, the second disk array, and/or other components of the storage devices. For example, the controllers may include a memory for storing the configuration data.

In some embodiments, the synchronization configuration needs to be stored in the two controllers for a long time. The configurations of the two controllers may need to be consistent. For example, when the first controller 510 is determined to be in an abnormal state, the second controller 520 that works normally may need to process at least a portion of the tasks of the abnormal controller in time according to the configuration data associated with the first disk array 540.

In some embodiments, the transmission of the synchronization mark and the transmission of the heartbeat packets may be performed independently. The interval of transmitting such data may be the same or may be different. For example, the interval for transmitting the synchronization mark may be longer than the interval for transmitting the heartbeat packets.

As used herein, "sending the heartbeat message with a delay" may be understood as waiting until a predetermined time interval between sending the latest heartbeat message and a current time has passed. In other words, the heartbeat message is sent to the controller according to the predetermined time intervals. For example, the predetermined time interval may be 1 second. If the first controller sends a heartbeat message to the second the controller at 15:00:00, the first controller may send a new heartbeat message to the second the controller at 15:00:01. In some embodiments, a predetermined time interval related to the transmission of the heartbeat message for determining whether the status of a controller is normal or abnormal may be referred to as a "first predetermined time interval". A predetermined time interval related to the transmission of the heartbeat message for determining whether the status of an abnormal controller has returned to normal may be referred to as a "second predetermined time interval". In some embodiments, the first predetermined time interval may be the same as the second predetermined time interval. In some embodiments, the second predetermined time interval may be different form the second predetermined time interval. For example, the second predetermined time interval may be longer than the first predetermined time interval.

Optionally, the first controller 510 is further configured to send the heartbeat message to the second controller 520, and determine that the state of the second controller 520 returns to normal if the heartbeat response message generated by the second controller 520 is received within a predetermined time period, and send a configuration synchronization mark to the second controller 520. The first controller 510 may be further configured to disable the second wide port in response to a determination that the configuration has completed synchronization; and synchronize with the second controller 520 by sending a synchronization configuration (i.e., the configuration data) to the second controller 520 in the case of determining that the configuration has not completed synchronization. The first controller 510 may further disable the second wide port after the synchronization configuration is complete.

The second controller 520 controls the second disk array 550 via the third wide port.

Figure 6:
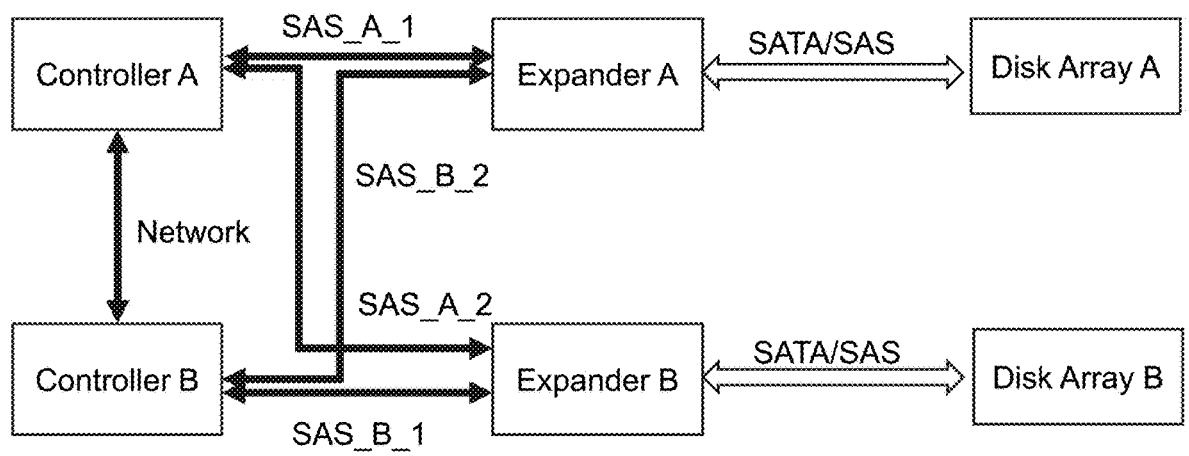
FIG. 6 is a block diagram illustrating an exemplary dual-controller and active-active storage system according to some embodiments of the present disclosure.

FIG. 6 is a block diagram illustrating an exemplary dual-controller and active-active storage system according to some embodiments of the present disclosure. As shown in FIG. 6, the disk expander includes a disk expander A and a disk expander B.

In the following description regarding FIG. 6, merely by way of example, the first controller 510 is the controller A, the second controller 520 is the controller B, and the expander 530 includes the disk expander A and the disk expander B. The first disk array is the disk array A, the second disk array is the disk array B, the first wide port is SAS_A_1, the second wide port is SAS_A_2, the third wide port is SAS_B_1, and the fourth wide port is SAS_B_2.

The upstream port of the disk expander (or expander) A is connected with the controller A through the wide port SAS_A_1, and is connected with the controller B through the wide port SAS_B_2. The downstream port is connected with the disk array A.

Similarly, the upstream port of the disk expander B and the controller B are connected through the wide port SAS_B_1, and are connected with the controller A through the wide port SAS_A_2. The downstream port is connected with the disk array B.

In some embodiments, the controller A and the controller B may work in a dual-controller and active-active mode, so that both controllers can work in synchronization. A portion of the tasks that need to be processed are allocated to the controller A, and another portion of the tasks are allocated to the controller B. The controller A may be configured to control the disk array A. The controller B may be configured to control the disk array B. The controller A and the controller B may independently process the tasks at the same time. When one of the controllers is detected to be in an abnormal state, another controller may take over at least a portion of the tasks allocated to the abnormal controller. For example, when the controller A and the controller B work normally, each of the controller A and the controller B is configured to store 500 videos in the disk array A or the disk array B. When the controller A is abnormal, the controller B may take over the work of the controller and store all 1000 videos.

In the dual-controller mode, the two controllers may be connected with the expander via a wide port, respectively. The controller A may be a backup controller for the controller B, while the controller B may be a backup controller for the controller A. For example, in the active-active mode, when the controller A and the controller B are both in a normal state, the controller A is connected with the expander A through wide port SAS_A_1, and wide port SAS_A_2 is disabled. The controller B is connected with expander B through wide port SAS_B_1, and wide port SAS_B_2 is disabled.

In normal operations, the controller A and the controller B work at the same time, the controller A manages the disk array A; the controller B manages the disk array B and allocates storage performance.

The disk array A and/or the disk array B may include SAS mechanical hard disk, SATA mechanical hard disk, SATA SSD, NVME SSD, etc., and are not limited by the mentioned disk arrays.

The disk expander includes a disk expander that supports SAS protocol and/or NVME protocol. The disk expander may be connected with an upstream port between the controller A and/or the controller B via a SAS protocol, and may also be connected via a PCIE protocol.

When the controller A appears abnormal, the controller B may detect the abnormal state through the network and take over the disk array A through the wide port SAS_B_2. On the contrary, when the controller B is in an abnormal state, the controller A also takes over the disk array B. The specific process is as follows: For example, the controller A is abnormal and is detected by the controller B. The controller B may be connected with the expander B through the wide port SAS_A_2, and the wide port SAS_B_1 is kept connected with the expander B.

When the controller B returns to a normal state, the controller B may re-take the tasks that were previously taken over by the controller A, including but not limited to the expander B and the disk array B.

In some embodiments, the storage system disclosed in the present disclosure may work in a cold standby mode. In this mode, one of the controllers may be designated as the main controller. When the main controller works, another controller does not work in synchronization with the main controller and serves as a backup controller. For example, when the controller A is working, the controller B does not process the tasks in synchronization with the controller A. The controller A may keep sending the synchronization configuration mark to the controller B and keep the configuration data synchronized. When the controller A is abnormal, the controller B immediately takes over the work of the controller A. In some embodiments, an operator may manage the storage system and adjust the working mode of the storage system, for example, based on a working load.

Figure 7:
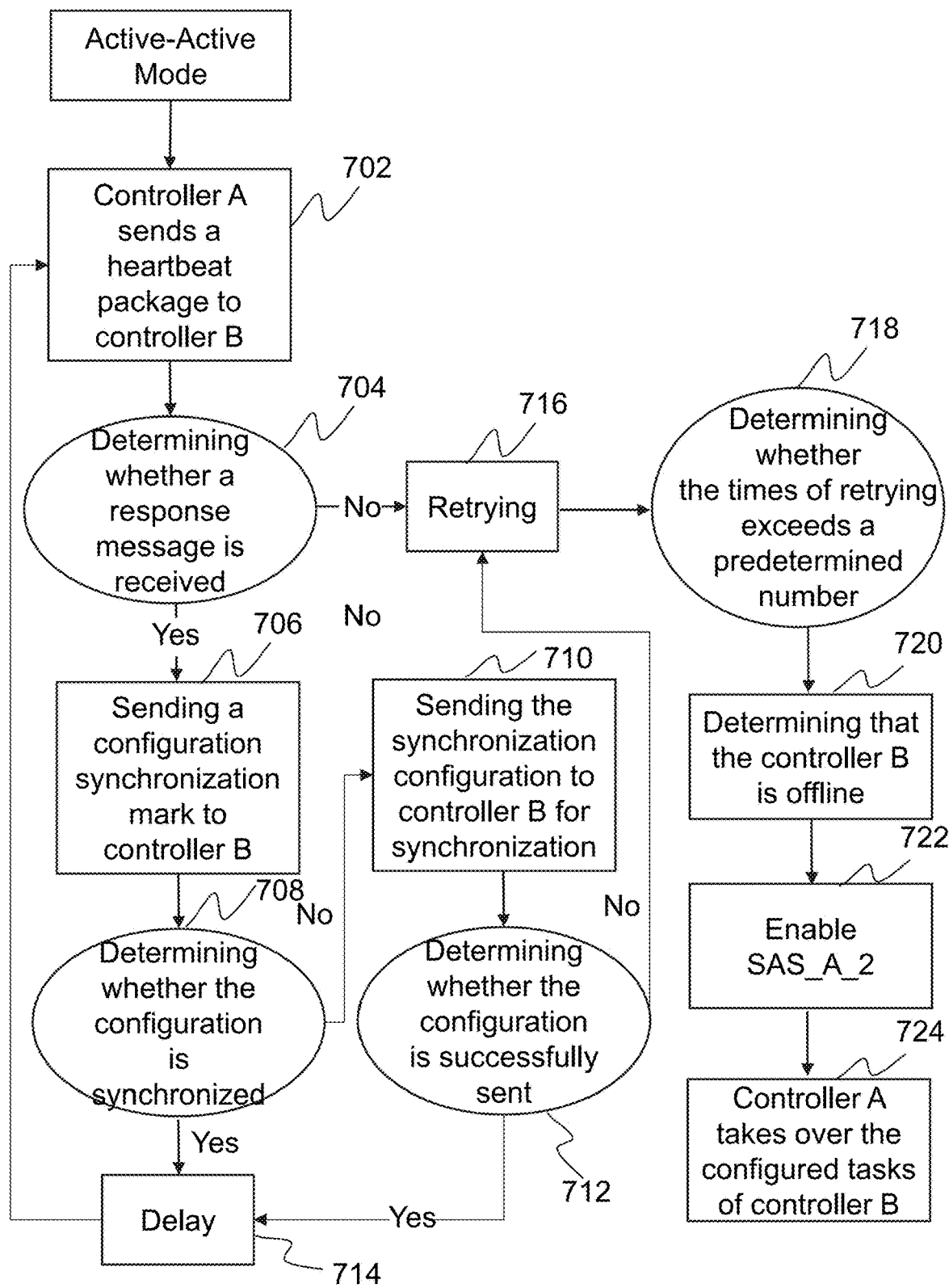
FIG. 7 is a flowchart of an exemplary process for controlling the dual-controller and active-active storage system under an active-active mode according to some embodiments of the present disclosure.

FIG. 7 is a flowchart illustrating an exemplary process for controlling a dual-controller and active-active storage according to some embodiments of the present disclosure. As shown in FIG. 7, the process 700 may include the following operations.

In operation 702, the controller A sends heartbeat packets to the controller B.

In some embodiments, the heartbeat packets may be data sent according to the predetermined time interval and may be used to detect whether the controller is in a normal working state. In some embodiments, the data content of the heartbeat packets may include a code, a number, a letter, a placeholder, or the like, or any combination thereof.

In operation 704, the controller A determines whether a response message for the heartbeat packet is received. The controller A may execute operation 706 based on the determination result that the response message is received, otherwise, the controller A may execute operation 708.

In operation 706, the controller A sends a configuration synchronization mark to the controller B.

In operation 708, the controller A determines whether the configuration is synchronized, and executes operation 714 based on the determination result that the configuration is synchronized, otherwise, the controller A executes operation 710.

In operation 714, the controller A sends a synchronization configuration to the controller B.

In operation 712, the controller A determines whether the transmission is successful, and executes operation 714 based on the determination result that the transmission is successful, otherwise, the controller A executes operation 716.

In operation 714, the controller A delays sending heartbeat packets to the controller B.

In operation 716, the controller A retries.

In operation 718, the controller A determines whether the times of retrying exceeds a predetermined number, and executes operation 510 based on the determination result that the retry exceeds the specified number of times, otherwise the controller returns to operation 702.

In some embodiments, the predetermined number of times of retrying may be set in advance. The controller A may determine the operating state of the controller B according to the number of retries and execute the next operation.

For example, the number of times to retry sending heartbeat packets may be set as 3 times. When the controller A sends heartbeat packets to the controller B three times in a row, and the controller A determines that no response message of heartbeat packets is received through the controller B, operation 720 may be executed.

In operation 720, the controller A determines that the controller B is offline;

In Operation 722, the controller A controls enable SAS_A_2;

In Operation 724, the controller A takes over the configuration of the controller B.

After the controller A takes over the service configuration of the controller B, the controller A keeps sending heartbeat packets to the controller B at predetermined time intervals to determine whether the controller B has returned to normal. If the controller B has returned to normal, the controller A stops processing data related to the tasks of the controller B, and the dual-controller and active-active state is recovered.

In some embodiments, the predetermined time period for sending the heartbeat packets may be set according to the operating state of the controller. When an abnormal state is determined for any of the controllers, the time interval in which the controller A sends heartbeat packets to the controller B is the same as and/or different from the time interval in which heartbeat packets are sent before the controller is abnormal. For example, in an active-active mode, the controller A may send the heartbeat packet at every 1 second. After the state of the controller B is determined to be abnormal, the controller A may take over at least a portion of the tasks of the controller B. The controller A may continue to send the heartbeat packet to the controller B at 30 seconds.

Figure 8:
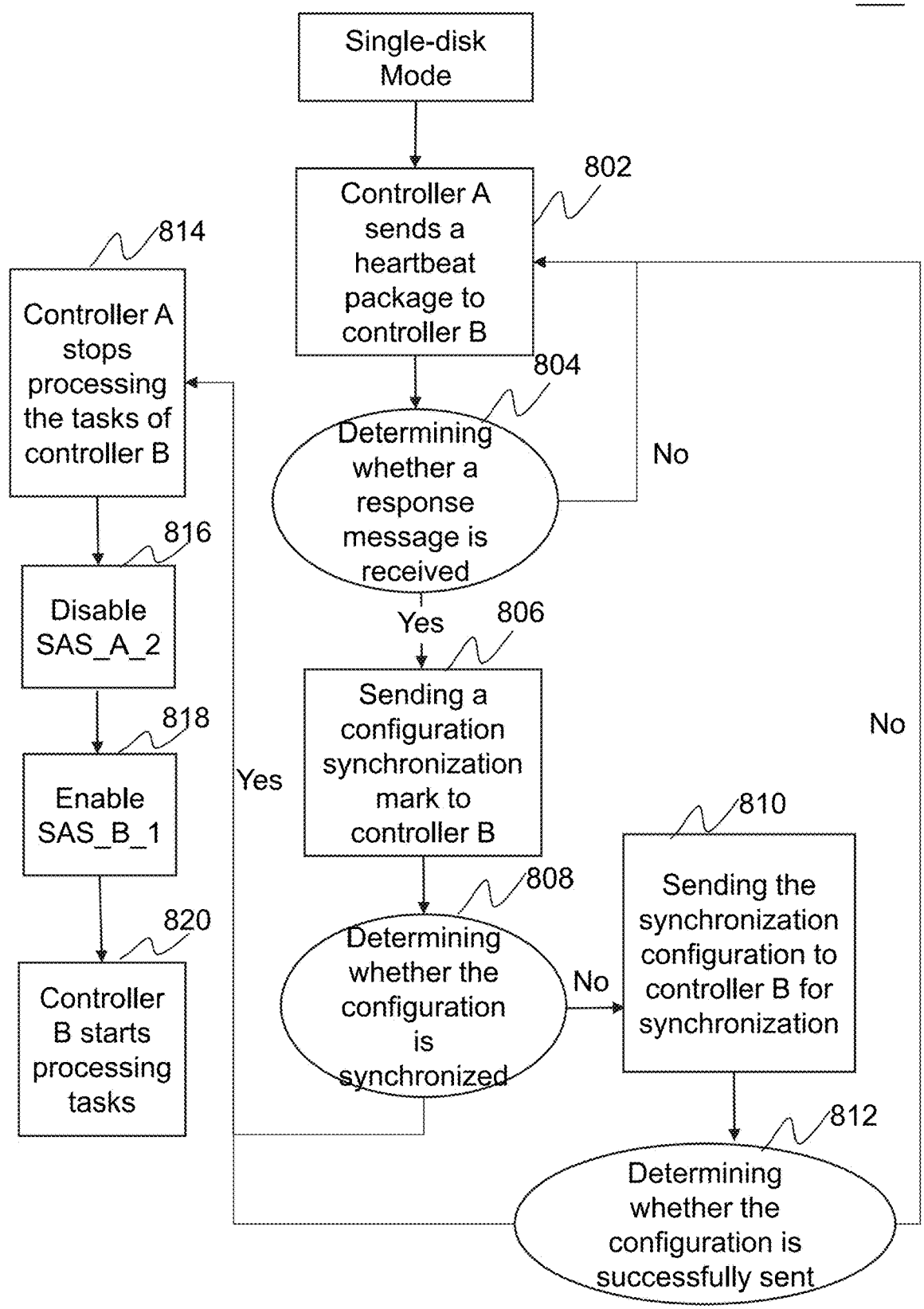
FIG. 8 is a flowchart of an exemplary process for controlling the dual-controller and active-active storage system under an active-active mode according to some embodiments of the present disclosure.

FIG. 8 is a flowchart of an exemplary process for controlling the dual-controller and active-active storage system under an active-active mode according to some embodiments of the present disclosure. As shown in FIG. 8, the process 800 may include the following operations.

In operation 802, the controller A sends heartbeat packets to the controller B.

In operation 804, the controller A determines whether a response message about opening B is received, and if yes, operation 806 may be executed, otherwise the operation may return to 802.

In operation 806, the controller A sends a configuration synchronization mark to the controller B.

In operation 808, the controller A determines whether the configuration has been synchronized, if the determination result is no, operation 810 is performed, otherwise, operation 812 is performed.

In operation 810, the controller A sends a synchronization configuration to the controller B.

In operation 812, the controller A determines whether the transmission is successful, and if the determination result is yes, the controller A executes operation 814, otherwise the controller A returns to operation 802.

In operation 814, the controller A stops processing the business of the controller B.

In operation 816, the controller A disables SAS_A_2.

In operation 818, the controller B enables SAS_B_1.

In operation 820, the controller B starts processing tasks.

In another optional embodiment, in the case that there is only one expander 530, the disk expander is logically segmented into two expanders (i.e., the third expander and the fourth expander). The first controller 510 is connected to the third expander through a fifth port, and the third expander is connected to the first disk array 540. The second controller 520 is connected to the fourth expander through a sixth port, and the fourth expander is connected to the second disk array 550.

Optionally, the first controller 510 is configured to send a heartbeat message to the second controller 520, and determine that the state of the second controller 520 is abnormal if the heartbeat response message returned by the second controller 520 is not received within the predetermined time period. The first controller 510 may combine the third expander and the fourth expander into the whole expander 530, and the first controller 510 may control the expander 530 by the fifth port to take over the configured tasks of the second controller 520.

Additionally or alternatively, the second controller 520 is configured to send a heartbeat message to the first controller 510, and determine that the state of the first controller 510 is abnormal if the heartbeat response message returned by the first controller 510 is not received within a predetermined time period. The second controller 520 may combine the third expander and the fourth expander into the whole expander 530, and the second controller 520 may control the expander 530 by the sixth port to take over the configured tasks of the second controller 520.

Optionally, the first controller 510 is configured to send a heartbeat message to the second controller 520, and send a configuration synchronization mark to the second controller 520 if the heartbeat response message of the second controller 520 is received within a predetermined time period, and delay sending the heartbeat message to the second controller 520 in the case of determining that the configuration has completed synchronization; synchronize with the second controller 520 by sending a synchronization configuration to the second controller 520 in the case of determining that the configuration has not completed synchronization, and send the heartbeat message to the second controller 520 with a delay after the synchronization configuration is complete.

Optionally, the first controller 510 is further configured to send the heartbeat message to the second controller 520, and determine that the state of the second controller 520 returns to normal if the heartbeat response message returned by the second controller 520 is received within a predetermined time period. The first controller 510 further sends a configuration synchronization mark to the second controller 520, and stop controlling the configured tasks of the second controller 520 in the case of determining that the configuration has completed synchronization; synchronizes with the second controller 520 by sending a synchronization configuration to the second controller 520 in the case of determining that the configuration has not completed synchronization, and stop controlling the configured tasks of the second controller 520 after the synchronization configuration is completed. The first controller 510 further logically divide the disk expander into at least a fifth expander and a sixth expander. The first controller 510 controls the third expander via the fifth port. The second controller 520 controls the sixth expander via the sixth port.

Figure 9:
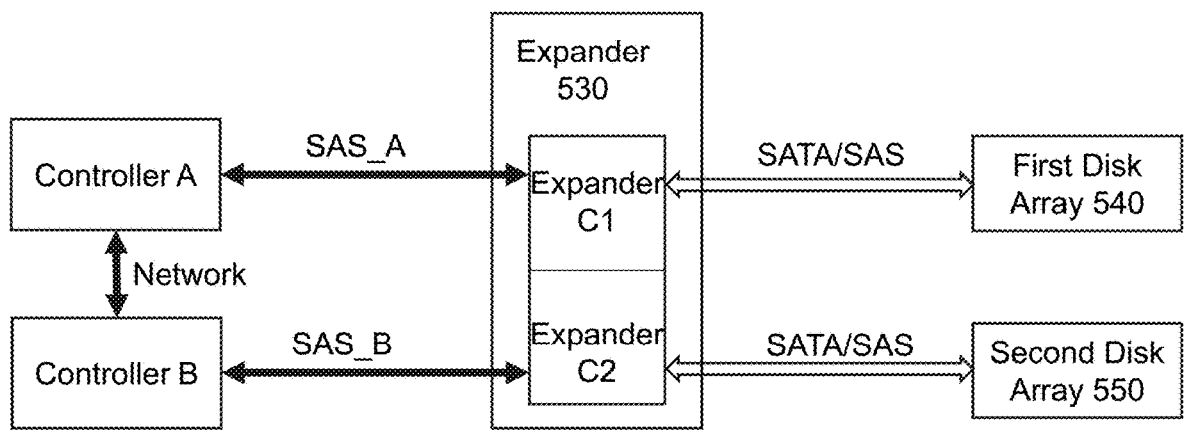
FIG. 9 is a block diagram illustrating an exemplary dual-controller and active-active storage system according to some embodiments of the present disclosure.

FIG. 9 is a block diagram illustrating an exemplary dual-controller and active-active storage system according to some embodiments of the present disclosure. As shown in FIG. 9, the expander is a physical module which may be logically segmented into two or more expanders (determined according to the number of controllers) through a protocol, such as the extended controller C1 and the extended controller C2. In an active-active mode, each controller controls a different expander. When the controller appears abnormal, the disk expander is combined into a whole expander 530 so that it can satisfy different controller working scenarios. Through the method described in the present disclosure, it is possible to make a controller-controlled hard disk fixed and extendable. A single physical disk expander may be divided into a plurality of disk domains separately by protocol logic.

As shown in FIG. 9, in some embodiments, the first controller is the controller A, the second controller 520 is the controller B, and the expander 530 may include an expander C1 and an expander C2. The fifth port is SAS_A, and the sixth port is SAS_B. In some embodiments, the type of the wide port may be a SAS wide port, an NVME wide port, or the like.

In some embodiments, a plurality of controllers may work in an active-active mode, in which the controllers control different expanders and work in synchronization to process different tasks. When a controller is determined to be in an abnormal state, the expander may be re-segmented through the protocol logic to obtain a plurality of storage regions.

In some embodiments, the expander segmented from a physical expander may be referred to as a sub-expander. A physical expander may be segmented into multiple sub-expanders, such as 2, 3, 4, 8, etc. The controllers may be connected with multiple sub-expanders segmented from multiple physical expanders. When one or more controllers are abnormal, one or more normal controllers may take over at least a portion of the one or more abnormal controllers. For instance, the abnormal sub-expander of the abnormal controller may be combined with the sub-expander of the normal controller(s). For example, when N controllers are working normally, one or more physical expanders may be connected to the N controllers. The one or more physical expanders may be segmented into N sub-expanders. Each sub-expander is connected with a corresponding controller. When a controller j is determined to be abnormal, the tasks of the controller j may be taken over by a normal controller i. The sub-expander K_j connected with the controller j and the sub-expander K_i connected with the controller I may be combined. At this time, the storage system may include a total of N−1 controllers and N−1 sub-controllers that are working in synchronization.

The disk array in the present disclosure may include various types of disk arrays, that is, the first disk array 540 and/or the second disk array 550 may include: a SAS disk array, a SATA disk array, an NVME disk array, or the like, or any combination thereof.

In some embodiments, the dual-controller and active-active storage system may be used for storing videos, images, audios, text files, or the like, or any combination thereof. The storage system enables multiple controllers to manage different disk arrays separately, and can also enable all disk arrays to be controlled by one controller.

At the same time, the storage system also realizes the effect that a dual-controller storage server may use SAS hard disk, SATA mechanical disk, SATA SSD or NVME SSD. Thus, disks with a relatively low cost, such as the SATA disk may be used for the dual-controller storage system. The total cost for building the storage system may be reduced.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A dual-controller storage system, comprising a first controller, a second controller, at least one expander, a first storage array, and a second storage array, wherein
   the at least one expander is connected with the first controller, the second controller, the first storage array, and the second storage array,
   the first controller and the second controller are communicatively connected via a network, and
   when the first controller and the second controller both work in a normal state,
      the first controller is configured to control the first storage array;
      the second controller is configured to control the second storage array; and
      the first controller and the second controller work in synchronization;
         wherein the at least one expander includes a first expander and a second expander, wherein
            the first expander and the second expander are physically independent;
            the first controller is connected with the first expander via a first port;
            the first controller is connected with the second expander via a second port;
            the second controller is connected with the second expander via a third port;
            the second controller is connected with the first expander via a fourth port;
            the first expander is connected with the first storage array; and
            the second expander is connected with the second storage array; and
         wherein when the second controller is in the normal state,
            the first port and the third port are enabled; and
            the second port and the fourth port are disabled.

2. The system of claim 1, wherein the first controller is configured to: send a heartbeat message to the second controller at first predetermined time intervals; and determine, based on feedbacks of the heartbeat message, whether the second controller is in a normal state or an abnormal state.

3. The system of claim 2, wherein in response to the determination that the second controller is in the normal state,
   the first controller is configured to
      determine whether configuration data of the first storage array are synchronized in the second controller;
      in response to a determination that the configuration data of the first storage array are not synchronized, send the configuration data to the second controller.

4. The system of claim 1, wherein in response to a determination that the second controller is in the abnormal state, the first controller is configured to:
   enable the second port; and
   process one or more tasks of the second controller by controlling the second expander via the second port.

5. The system of claim 4, wherein in response to a determination that the second controller is in the abnormal state,
   the first controller is further configured to:
      send a heartbeat message to the second controller at second predetermined time intervals; and
      determine whether the second controller has returned to the normal state based on the heartbeat message; and in response to a determination that the second controller has returned to the normal state, disable the second port and stop processing the one or more tasks of the second controller; and the second controller is configured to control the second expander via the third port.

6. A method for controlling a dual-controller storage system, implemented on a computing device including at least one processor and at least one storage medium, the method comprising:

sending, by a first controller, a heartbeat message to a second controller at first predetermined time intervals;

determining, by the processor and based on the heartbeat message, whether the second controller is in a normal state or an abnormal state; and in response to a determination that the second controller is in the normal state, causing the first controller to control a first storage array; and causing the second controller to control a second storage array, wherein at least one expander is connected with the first controller, the second controller, the first storage array, and the second storage array; and the first controller and the second controller work in synchronization;

wherein the at least one expander includes a first expander and a second expander, wherein the first expander and the second expander are physically independent;

the first controller is connected with the first expander via a first port;

the first controller is connected with the second expander via a second port;

the second controller is connected with the second expander via a third port;

the second controller is connected with the first expander via a fourth port;

the first expander is connected with the first storage array; and the second expander is connected with the second storage array; and wherein when the second controller is in the normal state, the first port and the third port are enabled; and the second port and the fourth port are disabled.

7. The method of claim 6, wherein in response to the determination that the second controller is in the normal state, the method further comprises:

determining whether configuration data of the first storage array are synchronized in the second controller;

in response to a determination that the configuration data of the first storage array are not synchronized, causing the first controller to send the configuration data to the second controller.

8. The method of claim 6, wherein in response to a determination that the second controller is in the abnormal state, the method further comprises:

enabling the second port; and causing the first controller to process one or more tasks of the second controller by controlling the second expander via the second port.

9. The method of claim 8, wherein in response to a determination that the second controller is in the abnormal state, the method further comprises:

causing the first controller to send a heartbeat message to the second controller at second predetermined time intervals; and determining whether the second controller has returned to the normal state based on feedbacks of the heartbeat message; and in response to a determination that the second controller has returned to the normal state, disabling the second port;

causing the first controller to stop processing the one or more tasks of the second controller; and causing the second controller to control the second expander via the third port.

10. A non-transitory computer readable medium, comprising a set of instructions for controlling a dual-controller storage system, wherein when executed by at least one processor, the set of instructions direct the at least one processor to effectuate a method, the method comprising:

sending, by a first controller, a heartbeat message to a second controller at first predetermined time intervals;

determining, by the processor and based on the heartbeat message, whether the second controller is in a normal state or an abnormal state; and in response to a determination that the second controller is in the normal state, causing the first controller to control a first storage array; and causing the second controller to control a second storage array, wherein at least one expander is connected with the first controller, the second controller, the first storage array, and the second storage array; and the first controller and the second controller work in synchronization;

wherein the at least one expander includes a first expander and a second expander, wherein the first expander and the second expander are physically independent;

the first controller is connected with the first expander via a first port;

the first controller is connected with the second expander via a second port;

the second controller is connected with the second expander via a third port;

the second controller is connected with the first expander via a fourth port;

the first expander is connected with the first storage array; and the second expander is connected with the second storage array; and wherein when the second controller is in the normal state, the first port and the third port are enabled; and the second port and the fourth port are disabled.

* * * * *